Dec. 25, 1951        J. J. PACEY        2,579,754
CONTROL VALVE AND BOOSTER FOR LUBRICANT NOZZLES
Filed Dec. 12, 1950
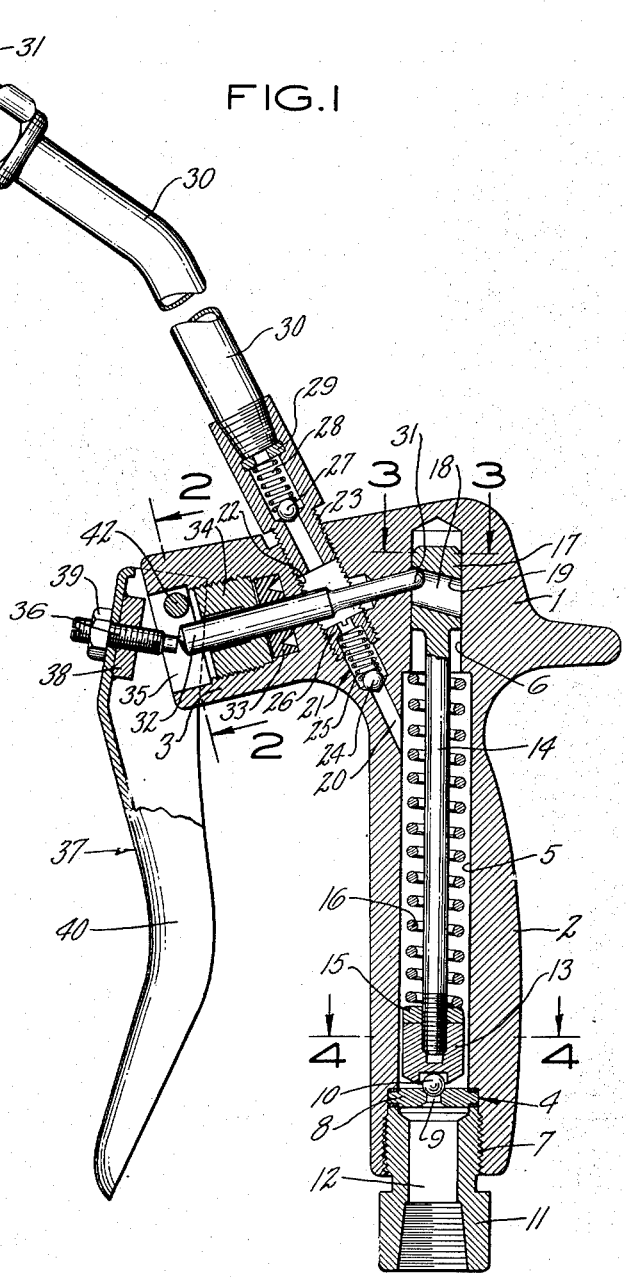
INVENTOR
JOHN J. PACEY
BY *Chapin & Neal*
ATTORNEYS Patented Dec. 25, 1951

2,579,754

UNITED STATES PATENT OFFICE 2,579,754

CONTROL VALVE AND BOOSTER FOR LUBRICANT NOZZLES

John J. Pacey, Springfield, Mass., assignor to Gilbert & Barker Manufacturing Company, West Springfield, Mass., a corporation of Massachusetts Application December 12, 1950, Serial No. 200,465

5 Claims. (Cl. 222—124)

This invention relates to improvements in control valves and boosters adapted for use in connection with the nozzles of lubricant-servicing equipment, such for example as are commonly employed in injecting lubricant into the nipples of lubricant-receiving fittings of automotive vehicles.

The invention has for one object the provision in a nozzle of the class described of improved actuating means for the shut-off valve of the nozzle adapted for easy manual operation in opening the valve against the very high pressure, acting to hold it closed, and in holding the valve open during dispensing.

The invention has for another object the provision in a nozzle of the class described of booster means within the nozzle actuated by the same means which actuates the shut-off valve and coincidentally with the opening movement of such valve.

The invention will be disclosed with reference to the one illustrative example of it shown in the accompanying drawings, in which:

Fig. 1 is a sectional elevational view of a lubricant nozzle embodying the invention; and Figs. 2, 3, and 4 are cross sectional views taken on the lines 2—2, 3—3 and 4—4, respectively, of Fig. 1.

Referring to these drawings, the control valve includes a body member 1, having a hand grip portion 2 and an integral lateral projection 3. The portion 2 is longitudinally bored forming passages 4, 5 and 6 of progressively decreasing diameter and an interiorly threaded portion 7 at the outer end of passage 4. Seated on the shoulder, formed at the intersection of the passages 4 and 5, is a washer 8 having a passage 9 therethrough, surrounded by a valve seat adapted for engagement with the ball inlet valve 10. Washer 8 is clamped to its seat by a nipple 11, which is threaded into portion 7 and is itself threaded to adapt it for connection to a supply hose of lubricant under pressure. Nipple 11 has an inlet passage 12 in constant communication with the passage 9. The inlet valve 10 is confined in a recess in the lower end face of a guide 13, threaded on one end of a valve stem 14, and held thereto by a lock nut 15. This guide is slidably engaged with the wall of passage 5 and has slabbed off sides as shown in Fig. 4 to permit lubricant to flow past it. A spring 16 in passage 5 is seated at one end on the shoulder formed by the intersection of passages 5 and 6 and at the other end engages the nut 15, forcing the latter and head 13 downwardly and pressing valve 10 against its seat to close the inlet passage 9. The upper end of stem 14 has a guide 17, which is slidably engaged with the wall of passage 6 and has slabbed off sides as shown in Fig. 3 to permit lubricant to flow past it. This guide 17 has a transverse slot 18 through it. The upper wall 19 of this slot forms a cam, which is inclined at an acute angle to a plane passing through the axis of the portion 17 at right angles thereto and which is adapted to be actuated under manual control by means to be later described.

Communicating with passage 5 and diverging therefrom at an acute angle is a passage 20, which connects at one end with a passage 21 and the latter in turn connects with one end of a threaded passage 22 which extends diametrically across the lateral projection 3 and receives a threaded nipple 23. At the junction of passages 20 and 21 is a seat which is engaged by a ball valve 24, held closed by a spring 25, acting against an annular retaining nut 26, threaded into the inner end of passage 22. This valve 24 opens in the direction of the outflow of lubricant. In the nipple 23 is a ball check valve 27, held closed by a spring 28, acting against an annular retaining washer 29 held in place by the inner end of an outlet tube 30, which end is threaded into nipple 23. On the other end of tube 30 is a nozzle or coupling 31 of any suitable kind for engagement, one at a time, with lubricant nipples to be serviced. The nozzle, tube and nipples 11 and 23 and the member 1 are considered as the body of the device.

The inlet valve 10 is adapted to be opened by the inner end 31 of a pin 32 which is mounted for longitudinal sliding movement in the lateral projection 3. The pin 32 spans the passage 22 and the inner end 31 enters slot 18 and engages cam 19. As the pin is thrust inwardly, its inner end 31, acting on cam 19, raises stem 14 and allows valve 10 to be opened by the pressure of the lubricant supplied to passage 9. A seal 33 surrounds pin 32 and is held in place under compression by a gland nut 34 threaded into the projection 3. The outer end of pin 32 lies in a recess 35 in the outer end of projection 3 in the path of the inner end of an actuating screw 36 which is adjustably mounted in a hand lever 37 near its fulcrum. As shown, screw 36 is threaded into a nut 38, welded to the inner face of lever 37, and a lock nut 39 is provided on the outer end of the screw to hold it in its various positions of adjustment. The lever has parallel side flanges 40 (Fig. 2) which lie one adjacent each of the two flat faces 41 formed on the exterior of projection 3 and a bolt 42 passes through these flanges and the projection forming the fulcrum of the lever. The lever 37 extends away from the fulcrum in the same general direction as the hand grip portion 2 and may be manually drawn toward portion 2 to open the valve.

That portion of pin 32, which is of larger diameter and which extends into the passage 22 between the two longitudinally-spaced check valves 24 and 27, is considered as a displacement portion because as it moves inwardly (to the right as viewed in Fig. 1) into passage 22 it will displace some of the lubricant and expel it through the second check valve 27. By this arrangement a booster action is effected coincidentally with the opening of the inlet valve 10.

In use, lubricant is supplied under suitable pressure, which may for example be 2000 pounds per square inch, to the inlet end of nipple 11. The normal condition of the device is that all the described passages, which together in effect constitute a single passage interconnecting the inlet and outlet of the body, are filled with lubricant, the inlet valve 10 is closed, and pin 32 and handle 37 are in the retracted positions illustrated. The lubricant will be under substantially atmospheric pressure except in the passages 12 and 9. In operation, the operator holds the device by the hand grip portion 2 with his fingers engaging the lever 37. The coupling 31 is then applied to a lubrication fitting, to be serviced, and pressure is applied to handle 37 to open valve 10. As soon as this valve opens slightly, the lubricant is placed under a heavy pressure commensurate with that of the supply, augmented if need be by the booster action which occurs in passage 22 during the inward movement of pin 32 to open the valve 10. If the lubrication fitting is plugged, then the pressure can be built up much higher until the plugged fitting is opened and, in the instant case, to a limit of about 5000 pounds per square inch. The one handle actuates both the shut-off valve and the booster.

The invention thus provides an improved control valve for lubrication nozzles with an improved actuating means for the shut-off valve of the nozzle and with an improved booster operated by the actuating means coincidentally with the opening movement of the shut-off valve.

What is claimed is:

1. A lubricant control valve, comprising a body having a passage therethrough with an inlet adapted for connection to a supply of lubricant under pressure and an outlet for delivery of the lubricant, a valve in said passage near the inlet, first and second check valves in said passage at longitudinally spaced locations between said first-named valve and outlet, both said check valves opening only in the direction of flow of the lubricant through said passage and the second check valve being located nearer the outlet than the first check valve, means for controlling the first-named valve including a reciprocable member crossing said passage at a location between said check valves and movable in one direction to cause the opening of the first-named valve and in an opposite direction to cause closing of such valve, said member having thereon a displacement portion, said member when moved in the first-named direction moving said displacement portion to displace lubricant from that portion of the passage between the check valves and expel it through the second check valve to boost the pressure of the lubricant delivered through said outlet.

2. A lubricant control valve, comprising a body having a passage therethrough with an inlet adapted for connection to a supply of lubricant under pressure and an outlet for delivery of the lubricant, a valve seat in said passage near the inlet, a valve cooperating with said seat, a member slidable in said passage and engageable with said valve, a spring acting on said member and tending to hold said valve engaged with said seat, a stem fixed to said member and located in said passage, said stem having therethrough a transverse slot one end wall of which forms a cam, a rod slidable in said body in a direction laterally of the axis of the valve stem with its inner end engaged with said cam, and a hand lever mounted on said body outside the same and engaging the other end of said rod for moving the latter inwardly and by coacting with said cam to move said stem and member against the force of said spring to permit said valve to open.

3. A lubricant control valve, comprising a body having a passage therethrough with an inlet adapted for connection to a supply of lubricant under pressure and an outlet for delivery of the lubricant, an inlet valve in said passage near the inlet end thereof, first and second check valves in said passage at longitudinally-spaced locations between said first-named valve and outlet, both said check valves opening only in the direction of flow of the lubricant through said passage and the second check valve being located nearer the outlet than the first check valve, a stem controlling the opening and closing of said inlet valve and having a transverse slot one end wall of which forms a cam, a rod slidable in the body in a direction laterally of the axis of said stem and crossing said passage at a location between said check valves, the inner end of said rod engaging said cam and operable when moved inwardly to move said stem and permit the inlet valve to open, a hand lever mounted on the body exteriorly thereof for moving said rod inwardly, said rod having a displacement portion movable when the rod is moved inwardly to displace lubricant from that portion of the passage between the check valves and expel it through the second check valve to boost the pressure of the lubricant delivered through said outlet.

4. A lubricant control valve, comprising a body having a passage therethrough with an inlet adapted for connection to a supply of lubricant under pressure and an outlet for delivery of the lubricant, said passage including a first straight section extending inwardly from the inlet toward an end wall of the body but terminating short of such end and a second straight section extending from the first section at a location intermediate the ends thereof diverging from the first section at an acute angle to the axis of the latter, the first section of the passage having a valve seat therein near said inlet, a valve cooperating with said seat, a stem controlling the opening and closing of the valve and extending through the first section of the passage and terminating with a cam located in that portion of the first section which lies beyond the point of intersection of the second section therewith, a rod slidable in said body crossing the second section of the passage and extending into said portion of the first section with its end engaging said cam, a hand lever mounted on said body exteriorly thereof for moving said rod inwardly against the cam to move said stem in a direction to enable the opening of said valve, and a spring acting to hold said valve closed and move the rod outwardly.

5. A lubricant control valve, comprising a body having a passage therethrough with an inlet adapted for connection to a supply of lubricant under pressure and an outlet for delivery of the lubricant, said passage including a first straight section extending inwardly from the inlet toward an end wall of the body but terminating short of such end and a second straight section extending from the first section at a location intermediate the ends thereof diverging from the first section at an acute angle to the axis of the latter, the first section of the passage having a valve seat therein near said inlet, a valve cooperating with said seat, a stem controlling the opening and closing of the valve and extending through the first section of the passage and terminating with a cam located in that portion of the first section which lies beyond the point of intersection of the second section therewith, a rod slidable in said body crossing the second section of the passage and extending into said portion of the first section with its end engaging the cam, a hand lever mounted on said body exteriorly thereof for moving said rod inwardly against the cam to move said stem in a direction to enable the opening of said valve, first and second check valves in the second section of said passage and on opposite sides of said rod, said check valves opening only in the direction of outflow of lubricant and the second check valve being nearer the outlet than the first check valve, said rod having thereon a displacement portion, said rod when moved inwardly moving said displacement portion to displace lubricant from that portion of the passage between the check valves and expel it through the second check valve to boost the pressure of the lubricant delivered through said outlet.

JOHN J. PACEY.

REFERENCES CITED

The following references are of record in the file of this patent:

UNITED STATES PATENTS

| Number | Name | Date |
|---|---|---|
| 2,546,258 | Farrell | Mar. 27, 1951 |